United States Patent [19]

Garcia et al.

[11] Patent Number: 5,547,483
[45] Date of Patent: Aug. 20, 1996

[54] SPACERS FOR FLAT DISPLAY SCREENS

[75] Inventors: Michel Garcia, Les Milles; Richard Pepi, Beziers, both of France

[73] Assignee: Pixel International, Rousset, France

[21] Appl. No.: 290,996

[22] PCT Filed: Dec. 28, 1993

[86] PCT No.: PCT/FR93/01307

§ 371 Date: Aug. 29, 1994

§ 102(e) Date: Aug. 29, 1994

[87] PCT Pub. No.: WO94/15244

PCT Pub. Date: Jul. 7, 1994

[30] Foreign Application Priority Data

Dec. 29, 1992 [FR] France ................................. 92 16063
Jan. 28, 1993 [FR] France ................................. 93 01188

[51] Int. Cl.⁶ ............................ C03B 23/20; E04C 2/54
[52] U.S. Cl. ...................... 65/42; 65/36; 65/54; 52/786.1
[58] Field of Search ................................. 65/42, 54, 36, 65/152, 41; 156/109, 102, 229, 106; 428/1, 34; 52/786.1, 786.13; 29/434, 436, 447, 469.5, 507

[56] References Cited

U.S. PATENT DOCUMENTS 4,428,764  1/1984  Snitzer et al. ............................. 65/31

FOREIGN PATENT DOCUMENTS 2931113  2/1981  Germany .
58-09532  6/1983  Japan .
59-15582  8/1985  Japan .
9415244  7/1994  WIPO .

*Primary Examiner*—Donald E. Czaja
*Assistant Examiner*—Calvin Padgett
*Attorney, Agent, or Firm*—Plevy & Associates

[57] ABSTRACT

A method for assembling a spaced flat panel display screen having a first plate and second plate, each with an internal facing surface that are opposing comprises the steps of positioning spacers on the internal facing surface of the first plate, positioning the second plate so that the internal facing surface of the second plate contacts the spacers, heating the spacers to a temperature causing soldering of the spacers to the plates, pulling the first and second plates apart to stretch the spacers to a predetermined distance, and cooling the spacers.

10 Claims, 2 Drawing Sheets

SPACERS FOR FLAT DISPLAY SCREENS

The present invention relates to spacers used in flat display screens as well as processes for implementing these spacers.

The invention more particularly relates to the industrial manufacturing of display screens, such as micropoints, plasma, liquid crystal, etc., screens, formed by two adjacent plates made of glass, quartz or silicon and forming a flat airtight chamber that is subjected to a vacuum.

Flat display screens require the use of spacers for maintaining a predetermined distance between the two support plates. To maintain a predetermined distance between the electrodes raises problems as regards the spacer's size (spacers must be invisible) and its implementation.

In the prior art processes, the distance to be kept between the two plates is generally provided by balls that are distributed over one of the plates and glued before the second plate is mounted. The distribution of the balls is controlled with a frame or an analogous device. Such a technique has many drawbacks:

The balls are inaccurately positioned which may cause some active portions of the electrodes disposed over the plates to be crushed.

It is difficult to control the final distance between the two plates due to the pressure applied by the plates onto the balls once vacuum is established.

The width of the balls cannot be smaller than their height.

The balls are subject to electrostatic charging that may cause destroying breakdowns.

An object of the present invention is to avoid the above-mentioned drawbacks. Indeed, the invention allows both to accurately control the distance between the plates and the position of the spacers and to decrease the lateral size of the spacers.

The invention uses continuous or discontinuous spacers formed by circular, polygonal or other threads or pads that are preferably made of glass or quartz. The spacers are made of fibers, pads or piles of various shapes that are glued, welded or sealed, either on one plate (their height being equal to the desired distance) or on both plates so as to be interleaved, each series of spacers providing a portion of the distance between the two plates once the process is completed.

Among the attached drawings, that illustrate non-limitative exemplary embodiments of the invention:

The device of FIGS. 1–6 is constituted by a flat display screen, such as a micropoint, plasma or analogous screen, that is formed by two plates 1, 2 made of glass, quartz or silicon. Plates 1, 2 are associated with spacers 3, 4 formed by fibers preferably made of glass or quartz.

These circular, rectangular or polygonal fibers 3 can be threads or pads that are stretched and fixed by glueing, laser welding or by any other suitable means, onto one of the two plates 1, 2 (FIGS. 1, 2, 3, 4) or on both plates (FIGS. 2, 5) in one or two parallel element arrays.

When fibers 3 are disposed over only one plate, their height must be chosen to be equal to the desired distance.

Figure 1:
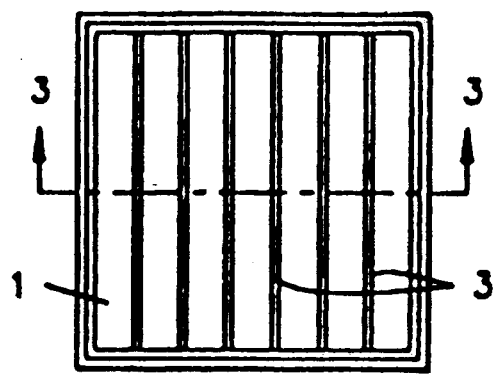
FIG. 1 is a top view of fiber spacers disposed in parallel over a plate.
Figure 2:
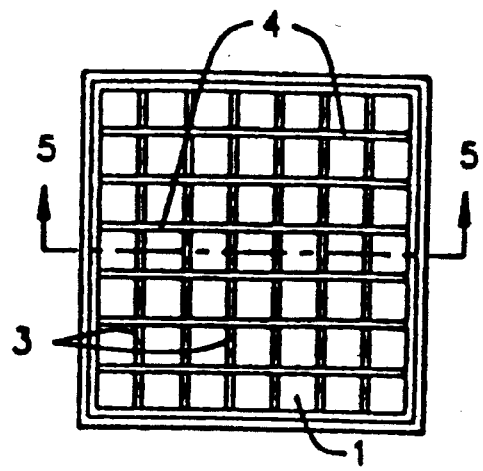
FIG. 2 is a top view of fiber spacers disposed in two interleaved patterns.
Figure 3:
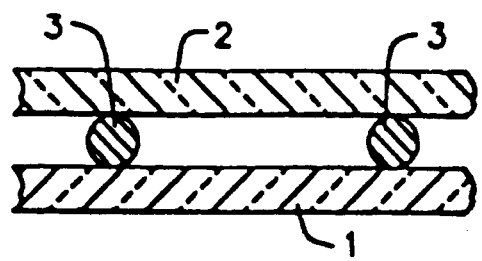
FIGS. 3 and 4 are enlarged partial cross-sectional views, along arrows 3—3 of FIG. 1, respectively showing circular and rectangular fibers.
Figure 4:
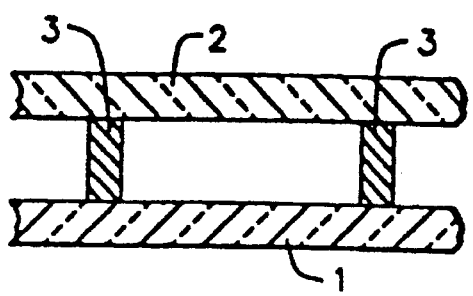
Figure 5:
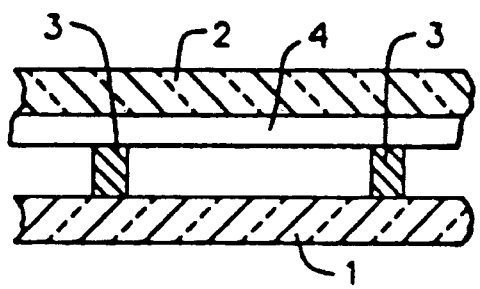
FIG. 5 is an enlarged partial cross-sectional view, along arrows 5—5 of FIG. 2, showing rectangular interleaved fibers.

In contrast, if the spacers are fixed onto the two plates, the distance must be equal to the sum of the heights or thicknesses of the fibers of the two networks, these heights being not necessarily identical. In the latter case, the two arrays are mounted in dissimilar directions, generally perpendicular, so as to interleave each other (FIG. 2).

Figure 6:
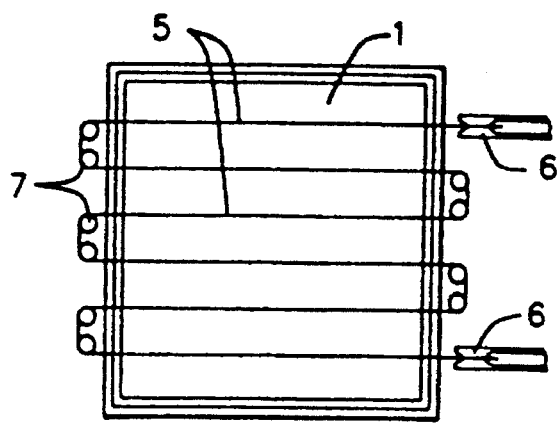
FIG. 6 is a top view of a plate over which is disposed a spacer network formed by a single stretched fusible glass fiber.

According to an alternative embodiment, the spacers 3 are formed by one fiber 5 or by a few fibers stretched between plates 1, 2 by means of clips 6 and thread-guide rollers 7 (FIG. 6).

When the total length of the fibers is important, due to the large supporting surface area thus obtained (with respect to the balls), spacers 3 are not liable to be crushed, despite the vacuum existing between the plates. Accordingly, the final distance obtained is substantially equal to the thickness of the fibers disposed alone or superposed.

Figure 7:
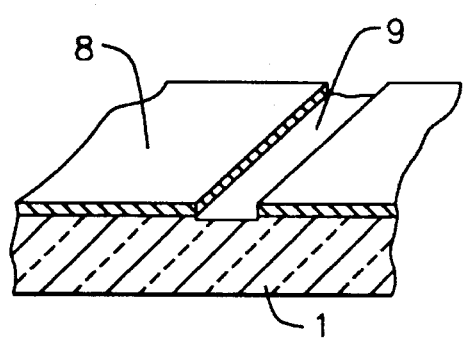
FIG. 7 is a partial perspective cross-sectional view of a plate after etching of the areas intended to accommodate spacers.

However, for short fibers, or for pads or piles disposed perpendicularly to the surface of plates 1, 2, the final distance will be advantageously accurately determined by a process including the following steps:

1. Treatment of the plates. The inner surfaces of plates 1, 2 are chemically etched by using a resist mask 8, for example, or mechanically etched or equivalent, to provide satisfactory bonding of the fusible glass spacers 3 onto the etched area 9 (FIG. 7).

2. Positioning of the spacers. Spacers 3, that may be glued or laser welded, are disposed over a plate 1, (that will be the lower plate during the process), on the etched areas 9. The size of the spacers is calculated as a function of their maximum width after stretching and as a function of the desired final distance between the two plates.

3. Cleaning/Outgassing. Plates 1, 2 are conventionally cleaned, and are then outgassed in a vacuum chamber while a distance sufficient to obtain the desired value is maintained between them.

Figure 8:
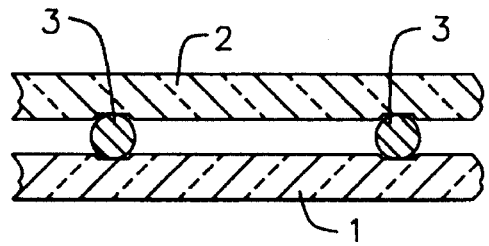
FIG. 8 is a partial cross-sectional view of two plates constituting a screen including spacers disposed over the etched areas.

4. Assembling of the plates. Both plates are brought nearer until they mechanically contact spacers 3 (FIG. 8).

Figure 9:
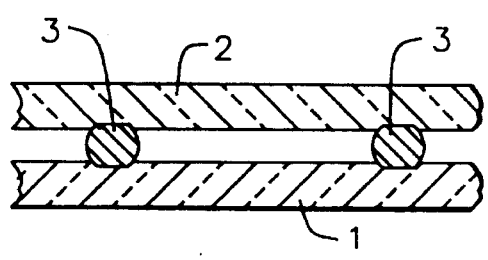
FIG. 9 is a partial cross-sectional view of the assembly after heating and welding of spacers achieved by partially melting the spacers.

5. Soldering of spacers. A heating step adapted to the mass of glass or quartz of plates 1, 2 and of spacers 3 rises the temperature of the assembly up to a value slightly higher than the melting temperature of the fusible glass constituting the spacers. The distance between the plates is controlled by mechanical wedges that limit the flattening of the spacers. The fusible glass of the spacers partially melts and "wets" the plates over the etched areas 9, thus causing soldering of the spacers over these areas (FIG. 9).

Figure 10:
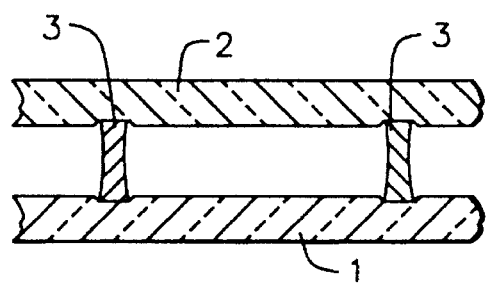
FIG. 10 represents the two plates moved aside one from the other so as to obtain the desired distance.

6. Stretching. Plates 1, 2 are set apart one from the other until the desired distance is obtained. Spacers 3 are thus stretched and their width is accordingly reduced (FIG. 10).

7. Cooling. The assembly is let to cool or is cooled down until spacers 3 are solidified. The process is completed.

Remarks

1. From step 3, the process is carried out in the same airtight chamber in order not to "break" the vacuum chain.

2. The external airtightness of the flat chamber can be simultaneously carried out by means of a string of peripheral fusible glass.

Figure 11:
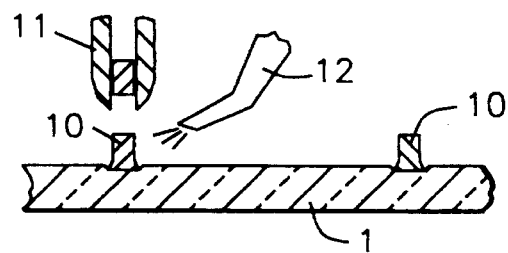
FIG. 11 is a partial cross-sectional view of a plate over which pad-shaped spacers are disposed.
Figure 12:
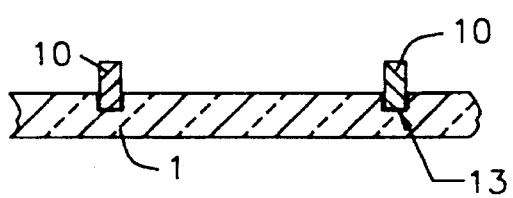
FIG. 12 is a partial cross-sectional view of spacers constituted by pads sealed in one of the plates.

According to an alternative embodiment of the invention, the spacers are constituted by pads 10 made of fusible glass disposed over the lower plate 1 by means of a cooled nozzle 11 and welded through fusion with a welding torch 12 for melting the base of the pads (FIG. 11). The pads can also be sealed in holes 13 previously pierced in the support plate 1 by any suitable means. Pads 10 may also be welded (FIG. 12).

The positioning of the various constitutive elements confers to the invention many advantages that have not yet been obtained with similar devices or processes.

We claim:

1. A method for assembling a spaced flat panel display screen having a first plate and a second plate, said first plate with an internal facing surface and bounded by a peripheral surface and said second plate with an internal facing surface and bounded by a peripheral surface, the internal facing surface of the first plate opposes the internal facing surface of the second plate, comprising the steps of:

positioning spacers, formed from a fusible material having a predetermined melting point at which said spacers can be stretched, on said internal facing surface of at least said first plate;

positioning said second plate so that said internal facing surface of said second plate contacts said spacers;

heating said spacers to a temperature that is slightly higher than said predetermined melting point of said spacers thereby partially melting said spacers and causing said spacers to wet said internal facing surfaces of said plates thereby causing soldering of said spacers to said plates;

pulling said first and second plates apart to stretch said spacers until a predetermined distance between said first plate and said second plate is obtained; and cooling said spacers to a temperature that is below said predetermined melting point.

2. The method according to claim 1 wherein said spacers are formed from glass.

3. The method according to claim 1 wherein said spacers are formed from quartz.

4. The method according to claim 1 further including the step of positioning a second plurality of spacers formed from fusible material having a predetermined melting point at which said second spacers can be stretched on said internal facing surface of said second plate before said step of positioning said second plate.

5. The method of claim 1, further including the step of treating said first and second plates so that bonding areas are delineated over said internal facing surfaces of said first and second plates before said step of positioning said spacers on said internal facing surfaces of said plates.

6. The method of claim 1, further including the step of a disposing a strand of fusible glass around said peripheral surface of said first and second plates after said step of pulling said first and second plates apart to stretch said spacers.

7. The method of claim 1, wherein said step of pulling said first and second plate apart to a predetermined distance is controlled by mechanical wedges that limit the flattening of the spacers.

8. The method according to claim 1, wherein said spacers are fibers having a substantially circular cross section.

9. The method according to claim 1, wherein said spacers are fibers having a substantially rectangular cross section.

10. The method according to claim 1 wherein said spacers are positioned on at least one of said plates by means of a cooled nozzle.

* * * * *